June 25, 1929. D. V. WRIGHT Re. 17,340

BOTTLE DISPENSING AND REFRIGERATING APPARATUS

Original Filed Jan. 28, 1924 3 Sheets-Sheet 1

Inventor
Dallas V. Wright
By Edward H. Church
His Attorneys

June 25, 1929. D. V. WRIGHT Re. 17,340

BOTTLE DISPENSING AND REFRIGERATING APPARATUS

Original Filed Jan. 28, 1924 3 Sheets-Sheet 2

Inventor
Dallas V. Wright

By Church & Church

His Attorneys

June 25, 1929. D. V. WRIGHT Re. 17,340

BOTTLE DISPENSING AND REFRIGERATING APPARATUS

Original Filed Jan. 28, 1924 3 Sheets-Sheet 3

Inventor
Dallas V. Wright

By Church & Church

His Attorneys

Reissued June 25, 1929. Re. 17,340

UNITED STATES PATENT OFFICE.

DALLAS V. WRIGHT, OF FORT DODGE, IOWA.

BOTTLE-DISPENSING AND REFRIGERATING APPARATUS.

Original No. 1,619,999, dated March 8, 1927, Serial No. 689,097, filed January 28, 1924. Application for reissue filed October 2, 1928. Serial No. 309,731.

This invention relates to an improved device for the facile handling of bottled goods.

A further object of this invention is the provision of a novel dispensing apparatus and refrigerator embodying a compact arrangement of details by means of which bottled products, such as soft drinks may be conveniently handled.

A further object of this invention is the provision of a combined dispensing and refrigerating apparatus including novel means for receiving bottles of various sizes, whereby they may be moved toward a dispensing point.

A further object of this invention is the provision of novel bottle supporting and dispensing means arranged in a novel relation within a refrigerating construction.

Other objects and advantages of this invention will be apparent during the course of the following detailed description.

In the accompanying drawings, forming a part of this specification, and wherein similar reference characters designate corresponding parts throughout the several views, Figure 1 is a fragmentary front elevation of the improved bottle dispensing and refrigerating apparatus, showing novel features of construction thereof.

Figure 1:
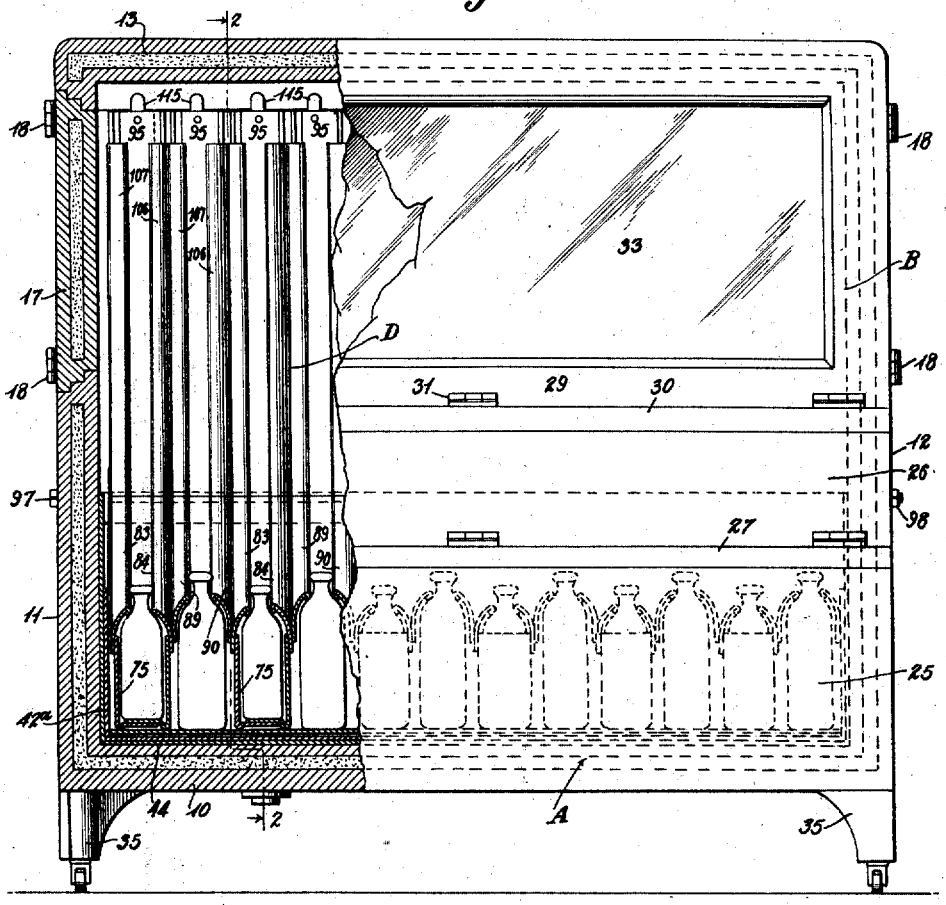

In the drawings, wherein for the purpose of illustration is shown only the preferred embodiment of this invention, the letter A may generally designate the improved bottle dispensing and refrigerating apparatus, which may consist of a cabinet B; means C in the cabinet for supporting cooling mediums, such as ice, cold water, and the like; and chute means D for supporting and regulating movement of bottles.

The cabinet B is of novel construction, including a flat bottom wall 10; right and left side walls 11 and 12, respectively; a top wall 13; and a rear wall 14. The top wall 13 is shorter than the bottom wall 10, due to the novel front wall construction of the cabinet. The side walls 11 and 12 are each preferably provided with upper doors 17 hingedly connected as at 18 therein; the openings leading through these side walls being for the purpose of removing and placing ice, as will be subsequently mentioned.

The rear wall 14, upwardly thereon is preferably provided with a pair of doors 20 and 21, hingedly connected adjacent opposite sides of the cabinet; the doors 20 and 21 having a latch mechanism 23 supported thereby as means of locking them in a closed position. These doors 20 and 21 are adapted to close a relatively wide opening in the rear wall of the cabinet, and through which rear opening the refill portions of the chute construction D may extend when the supply of bottled goods is being replenished.

The front wall structure of the cabinet B consists of a forward wall portion 25, which is placed upwardly at right angles to the bottom wall 10, at the forward margin thereof. A short wall portion 26 is also supported by the side walls 11 and 12, upwardly of the wall portion 25, and to the rear thereof; the wall portions 25 and 26, of course, being vertically disposed. The offset relation of these wall portions 25 and 26 enables the provision of a closure or lid 27 to be hingedly connected, as at 28 to the lower margin of the intermediate wall portion 26; this closure 27 being horizontally disposed when in shunt relation to close a lower opening into the compartment of the cabinet, and through which opening a person is enabled to remove the bottles from the cabinet as will be subsequently disclosed. The front wall construction also includes a wall portion 29 located in a vertical plane to the rear of the intermediate wall portion 26, and at its upper end being fixed along the front margin of the top wall 13. The offset relation of the intermediate wall portion 26 with the upper portion 29 permits a closure 30 to be hingedly connected, as at 31, adjacent the lower edge of the front wall portion 29; the closure 30 when in shut position being horizontally disposed, and closing an opening in the front wall construction through which an operator may reach to remove cracked ice or the like, as will be subsequently described. The closure members 27 and 30 at their free ends rest upon the wall portions 25 and 26 of the front wall construction, and it is preferred that the wall portion 29 of said front wall construction have spaced transparent panes 33 therein so that the contents of the upper portion of the cabinet will be visible therethrough. It is preferred to support the cabinet B upon legs 35 or the like, secured at the corners thereof in any approved manner. The bottom, top, side and rear walls, as well as the doors hingedly connected thereto, and also the front wall portion 25 are preferably of an insulated character, having an insulating material 38 embedded between outer and inner layers thereof, in accordance with any approved refrigerator insulating construction, and as is illustrated in the various views of the drawings.

Referring to the interior construction of the cabinet and more particularly the arrangement C therein for supporting cooling mediums, it is preferred to provide a metal lining 40 within the lower portion of the compartment of the cabinet B; this lining extending over the inside surface of the bottom wall 10, and upwardly for a distance along the inside surface of the side walls and rear wall, and upwardly along the inside surface of the front wall portion 25, substantially as is illustrated in the drawings. A cold water receiving pan or receptacle 41 rests within the cabinet B, inside of the lining 40; this pan 41 preferably consisting of a front wall 42 which abuts the inside lining of the front wall portion 25; side walls 42[a] which may abut against the lining at the side walls of the cabinet; and a bottom wall 44 which extends at its forward portion in abutting engagement with the lining 40, and at its rear end is curved upwardly, as at 45, to conform to the contour of the chute construction D as will be subsequently described. This water pan or receptacle 41 is open at the top thereof, and the chute construction D enters the compartment of this pan, so that the bottles as they are dispensed will enter the cold water medium in this pan, and pass to a point below the opening of the cabinet which is normally closed by the lid 27.

Upwardly of the cold water pan 41, and below the opening controlled by the front lid 30 a second pan or receptacle 47 is provided, which includes a front wall 48 which abuts against the inside surface of the wall portion 26, and which has side walls 49 which abut against the inside surfaces of the cabinet side walls 11 and 12. The receptacle 47 is considerably smaller than the cold water receptacle 41, and includes a bottom wall 50 which is perforated at its front portion, and which at its rear portion curves upwardly substantially concentric with the upward curve of the wall portion 45 of the cold water pan 41. This pan or receptacle 47 is preferably supported in the location above mentioned by means of brackets or angle irons 51 which may be suitably attached within the compartment of the cabinet B upon the inside surfaces of the side walls 11 and 12. This pan is entirely open at the top thereof, and is adapted to receive cracked ice, which may be removed in facile manner therefrom through the opening which is controlled by the closure 30, as can be readily understood from Figure 2 of the drawings.

A rack 55 consisting of a plurality of spaced slats in a horizontal plane, is preferably provided upwardly of the cracked ice pan 47, immediately to the rear of the front wall portion 29, which is adapted to support a cake or cakes of ice 56; this ice being inserted into the cabinet through the side doors 17 of the cabinet, so that cold water resulting from melting of the cake of ice may drip into the cracked ice pan or into the cold water pan as the rear end portions of both of these pans extend partially beneath the rack 55. It is also preferred that a lower rack 57 be provided, which consists of a plurality of spaced slats arranged in a horirzontal plane, arranged to the rear of the cold water pan 41, immediately adjacent the rear wall 14; this rack 57 being adapted for supporting a cake of ice 58, which is inserted through the rear wall opening of the cabinet B. Below the rack 57 a duct 60 may be provided in the bottom wall for drip of water from the compartment to any suitable overflow pan below the cabinet.

The chute construction D of this invention is novel, and is compactly arranged within the compartment of the cabinet B so that the bottled products dispensibly supported thereby receive a maximum cooling action from the cooling mediums within the compartment.

A bed plate 70 is supported in a stable relation by the side wall of the cabinet B, which extends through the water pan 41 in a slightly spaced relation over the bottom wall of this pan 41; the rear portion of the bed plate 70 curving upwardly to a point above the top of the water pan 41, and at which point a supporting rail 71 is horizontally affixed across the compartment of the cabinet B. This bed plate is provided for the purpose of securing the various chutes of the construction D in a stable, and adjustable relation.

Figure 5:
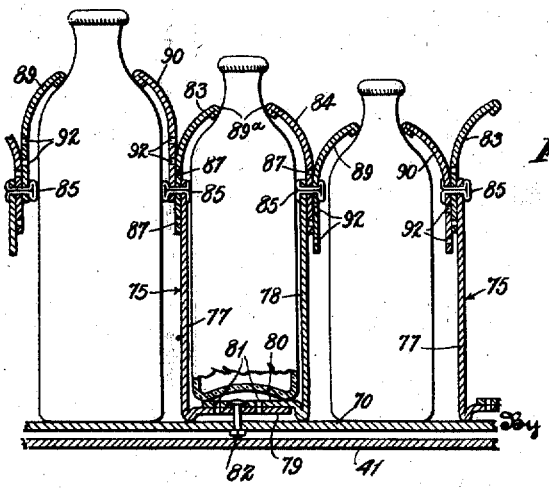
Fig. 5 is a fragmentary cross sectional view taken through a portion of the chute construction of the apparatus, showing the means by which the same may be adjusted for receiving bottles of various sizes in an efficient and a compact arrangement.

The chute construction D embodies a plurality of spaced chutes 75 adjustably secured upon the bed plate structure 70. Each of these chutes 75 consists of a pair of side walls 77 and 78 of analogous construction, which along their lower edges are provided with flanges 79 and 80 respectively arranged at right angles thereto. These flanges 79 and 80 which may appropriately be termed attaching flanges are each provided with a plurality of openings 81 arranged transversely therethrough, and at various distances along the length of these flanges these transverse series of openings 81 may be provided. They are provided as a means for receiving an attaching bolt 82 therethrough, which may be secured to the bed plate 70 for the purpose of holding the side walls 77 and 78 in a properly spaced relation according to the width of the bottle which the chute 75 is to receive. The transverse series of openings 81 may, of course, be selectively placed in alignment so that it is possible to arrange the walls 77 and 78 at various spaced distances to provide a chute of a proper width to receive the right size bottle. Along the upper marginal portion of the side walls 77 and 78 inwardly curved side flanges 83 and 84 may be respectively supported by the walls 77 and 78, in a detachable and adjustable manner by cotter pin or analogous elements 85. It is preferred that these flanges 83 and 84 be each provided with transverse series of openings 87 thereacross, through which the cotter pins 85 may be selectively placed so that the upper curved portions of the flanges 83 and 84 may be properly elevated or lowered according to the height of the bottle; the facing marginal edges 89[a] of the guide flanges 83 and 84 being adapted to receive the neck portion of the bottle in sliding engagement substantially as is illustrated in Figure 5 of the drawings. It is to be particularly noted that the chute constructions 75 are placed in a spaced relation, so that the space therebetween may also be utilized as a chute passage for dispensibly receiving bottles therealong. Within, and over this chute passage between the structure 75, guide flanges 89 and 90 may be supported by the cotter pin construction 85 of adjacent chute construction 75; these guide flanges 89 and 90 being of analogous structure with respect to the guide flanges 83 and 84, and having transverse series of openings 92 therein for selectively receiving the cotter pins 85 therethrough as a means by which the guide flanges 89 and 90 may be properly elevated or lowered to receive the bottles to be dispensed, as above mentioned. Thus, it is to be noted that each chute structure 75 provides a bottle receiving guide way or compartment therealong and the space between the facing walls of adjacent structure 75 is also utilized as a bottle guide way or compartment, as is illustrated in the drawings. The description thus far of the chute construction D takes into consideration only that portion of the chute structure which is mounted in a stationary manner within the cabinet compartment, and the chute structure 75 as well as the guide flanges 83, 84, 89 and 90 supported thereby curve upwardly at their rear ends and terminate at their upper edges on a common horizontal plane; the chute structure above this being hingedly or movably connected and providing an inclined or substantially vertically disposed refill portion. The guide flanges 83, 84, 89 and 90 at their forward edges terminate below the intermediate wall portion 26 of the cabinet B, so that the bottles as they are fed along the chute ways may ride from beneath the curved chute flanges to a point beneath the cover 27, so that upon opening of the closure or cover 27 a person may readily remove a desired bottle without inteference from the guide flanges 83, 84, 89 or 90.

Each chute way as provided by the stationary portions 75 has a hinged chute section 95 pivotally supported at its lower end upon a pivot bar 96 which is arranged transversely of the cabinet, immediately over the supporting rail 71; the ends of this bar 96 being connected in the sides of the cabinet B; one end of the bar 96 preferably having a head 97 thereon, and the other end being screw threaded for receiving a nut 98. Each of the hinged sections 95 consists of side walls 100 and 101 which are arranged in parallel vertical planes, and each of which has a bottom flange 102; which are arranged at right angles to the side walls 100 and 101; the bottom flanges of said walls overlying each other, and being provided with transverse series of apertures 103 therethrough which are adapted to be selectively placed in alignment for receiving bolts 104 by means of which the walls 100 and 101 may be connected in a desired spaced relation, according to the principle of this invention whereby bottles of various diameters or widths may be slidably received by the hinged and stationary portions of the chute structures. Each of the chute walls 100 and 101 respectively support guide flanges 106 and 107 thereon, which extend outwardly from the forward marginal edges thereof, being adjustably secured thereto. These flanges curve inwardly toward each other outwardly of the forward marginal edges of the walls to which they are attached, and each of these side walls or flanges 106 and 107 is provided at spaced points therealong with transverse series of openings 108 adapted to be placed in selective alignment with an opening in its wall 100 or 101, and to be attached to said wall by means of a cotter pin 110 or analogous securing element. Thus, the guide flanges 106 and 107 may be placed at a desired distance outwardly or inwardly with respect to the bottom wall of the hinged section 95, as provided by the flanges 102, so that bottles of various heights may be compactly arranged and efficiently located for guiding movement within the hinged sections 95.

Figure 2:
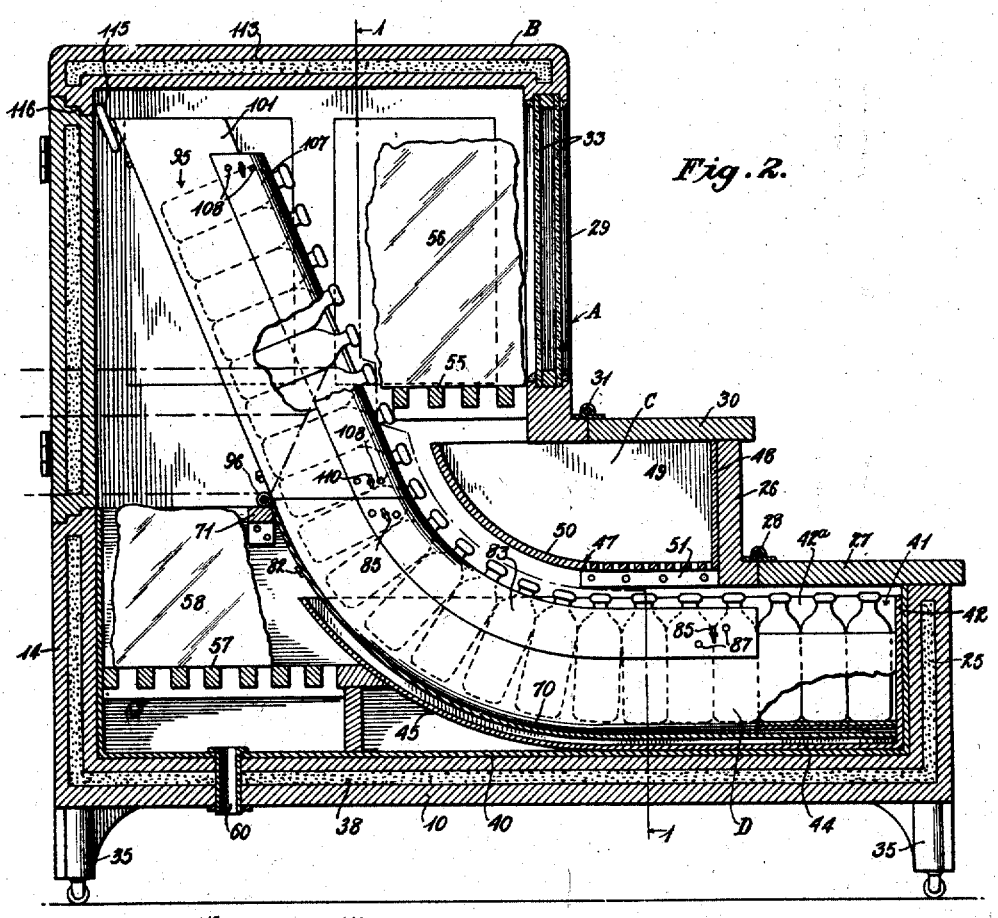
Fig. 2 is a cross sectional view taken substantially on the line 2—2 of Figure 1, showing novel interior arrangement of the apparatus.
Figure 4:
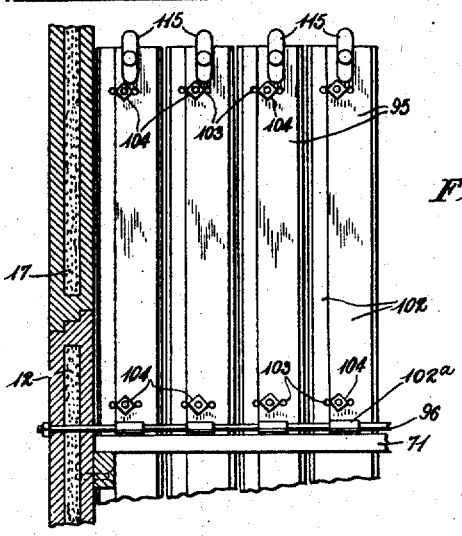
Fig. 4 is a fragmentary view, partly in cross section, showing a novel type of chute construction, especially showing the upper construction thereof.
Figure 3:
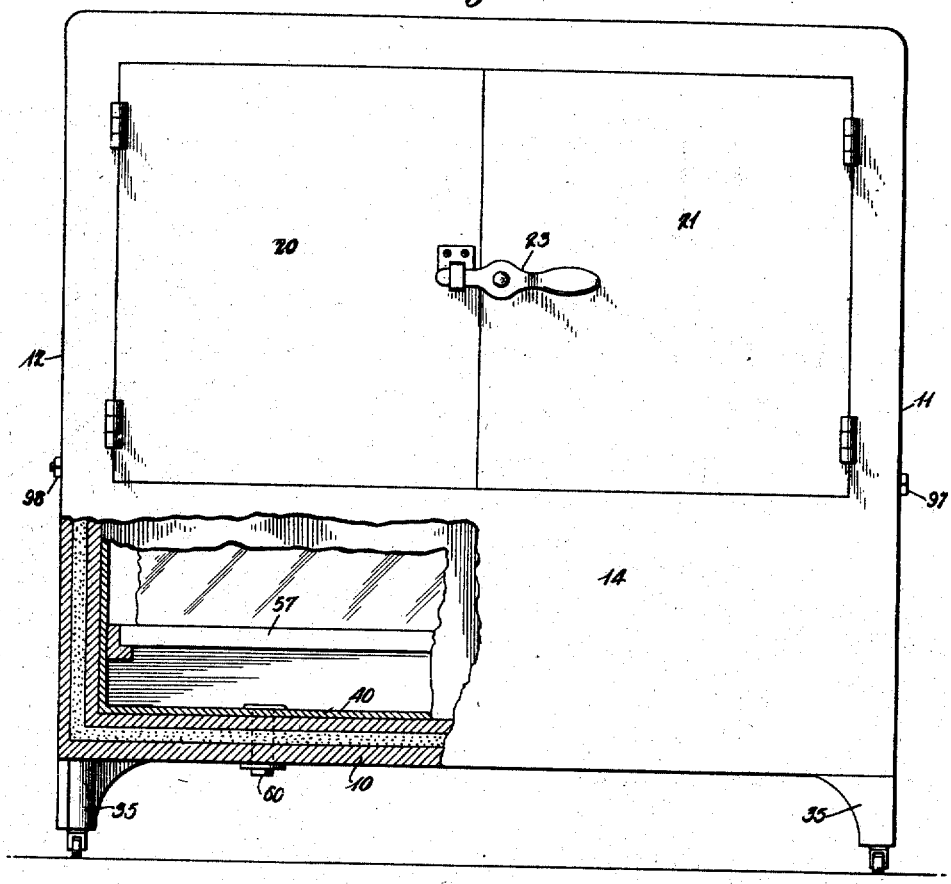
Fig. 3 is a fragmentary rear elevation of the improved dispensing and refrigerating apparatus.
Figure 6:
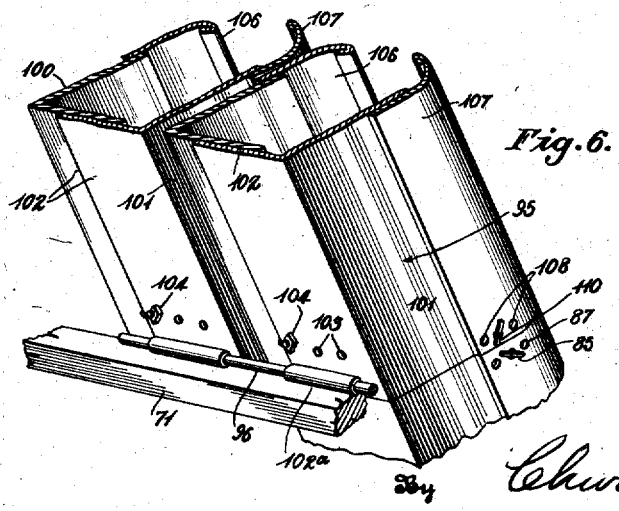
Fig. 6 is a fragmentary perspective view of a novel construction of the bottle dispensing chutes embodied in this invention.

Referring to the operation of this invention, the bottles are placed in the hinged chute sections 95 from the rear ends thereof; the hinged chutes when being refilled with bottles being supported in horizontal relation with their rear ends extending through the opening in the rear wall 14 of the cabinet B, substantially as illustrated in dotted lines in Figure 2 of the drawings. The bottles may thus be conveniently inserted into the hinged sections 95, and the hinged sections may then be swung upwardly into their diagonally inclined positions so that the bottles may pass by gravity down into the guide ways of the stationary portions of the chutes, until the bottles are arranged substantially as is illustrated in Figure 2 of the drawings. The upper end of each of the hinged sections 95 is provided with a latch 115 pivoted thereon which at its upper end may abut against a depending portion 116 of the rear wall 14 of the cabinet B, as the means of supporting the hinged sections in their inclined relation, notwithstanding the opening of the cabinet doors 20 and 21. When it is desired to lower any of the sections 95 it is merely necessary to turn the latch 115 until it is out of obstructing relation with respect to the wall flange 116. The operator by removing a bottle through the opening controlled by the lid 27 is assured that the bottles will be moved forward into the space left by the extracted bottle, incident to weight of the bottles superposed in the guide ways of the chutes. The bottles are located in the chutes so that they receive the maximum cooling benefit from the cakes of ice supported by the ledges or shelves 55 and 57, and the contents of the bottles are cooled incident to passing through the water in the container 41.

Various changes in the shape, size, and arrangement of parts may be made to the form of the invention herein shown and described, without departing from the spirit of this invention or the scope of the claims.

I claim:

1. In a dispensing device of the class described, the combination of a cabinet having an opening therein, and a closure for said opening, a chute construction in said cabinet including a lower fixed portion which adjacent the opening of the cabinet is curved upwardly, and a hanged upper portion connected adjacent the curved end of the fixed chute portion and adapted to be hingedly moved for horizontal positioning through the opening of the cabinet when the closure is opened from the cabinet for the purpose of refilling the chute, and means for supporting the hinged chute portion at an inclined position in the cabinet in aligning relation with the curved end of the fixed chute portion for dispensing bottles from the hinged chute portion into the fixed chute portion.

2. In a dispensing device of the class described the combination of a cabinet, a fixed dispensing guide chute section in the cabinet, a refill dispensing guide chute section hinged adjacent the fixed chute section, and bottle retaining flanges adjustably carried by the fixed and hinged chute sections adapted to be adjusted on said sections to control movement of bottles of various sizes.

3. In a dispensing device of the class described the combination of a cabinet, and chute means supported in the cabinet for gravity feed of bottles thereon comprising a fixed chute section having relatively adjustable side walls and relatively adjustable guide flanges mounted outwardly on said side walls, and a hinged chute section adapted to align with the fixed chute section comprising relatively adjustable side walls and relatively adjustable guide flanges supported by said side walls.

4. A bottle dispensing apparatus comprising a cabinet having a dispensing opening therein, and a chute construction for dispensibly receiving bottles therein, said chute construction consisting of a stationary bed plate, a fixed chute section adjustably connected to said bed plate to receive bottles of various sizes therein, and a hinged chute section connected above and in aligning relation with said fixed chute section for supporting bottles in feeding relation with respect to said fixed chute construction so that bottles will be fed along said chute sections toward the dispensing opening of said cabinet.

5. A bottle dispensing chute comprising a bottom wall, side walls connected with the bottom wall in spaced upwardly extending relation therefrom to provide a guideway therebetween for receiving articles to be dispensed, and bottle retaining extensions supported at the upper ends of said side walls adjustable therealong towards and away from the bottom wall, said extensions having inwardly projecting portions over the guideway between said side walls in facing relation with the bottom wall for adjustment towards and away therefrom upon movement of said retaining extensions, said projecting portions of the retaining extensions at their facing edges being spaced to receiving portions of the articles to be dispensed therebetween.

6. In a dispensing device of the class described the combination of a stationary dispensing guide chute section having an article dispensing guideway therealong, said stationary guide chute section being positioned for gravity feed of the articles therealong, and a second chute section hingedly connected adjacent the upper end of the stationary chute section having a guideway therealong, means to support the hinged chute sections with its guideway in unobstructed aligning relation with the guideway of the stationary chute section, said guideways of both the hinged section and stationary section being of substantially the same transverse cross section to slidably receive articles of a definite conformation therein, and means for supporting the hinged section with its guideway in a refill position out of aligning relation with the guideway of the stationary chute section.

7. A bottle dispensing and refrigerating apparatus comprising a cabinet having an upper filling opening and a lower discharge opening therein, a curved bottle chute mounted within the cabinet and so constructed as to receive a plurality of bottles in recumbent, side-by-side, stacked relation at the upper end of said chute and to deliver said bottles successively, by gravity feed, in side-by-side vertical position with their necks uppermost at the lower end of the chute adjacent the discharge opening, said chute having an opening extending throughout its upper wall through which the necks of the bottles project, and means for maintaining a refrigerating medium adjacent said chute within the cabinet.

8. In a bottle dispensing apparatus, a curved bottle chute adapted to receive a plurality of bottles in recumbent stacked relation at its upper end and to shift said bottles to side-by-side vertical position with their necks uppermost, as they are fed by gravity to the lower delivery end of said chute, said chute having a pair of converging flanges forming an opening extending longitudinally of said chute and through which the necks of the bottles project.

9. A gravity feed bottle cooling cabinet provided with a cooling agent, a bottle chute extending downward and curved forward into a horizontal position, means for opening and closing the cabinet whereby bottles may be inserted into the lower horizontal portion of said chute in vertical parallel relation and whereby bottles may be inserted into the upper vertical portion and intermediate portion of the chute in substantially parallel relation with each other in such a manner that as the bottles are fed forward by gravity they assume a vertical position in the horizontal portion of the chute.

DALLAS V. WRIGHT.